United States Patent
I'Anson

(10) Patent No.: US 8,369,247 B2
(45) Date of Patent: Feb. 5, 2013

(54) METHOD AND SYSTEM FOR FACILITATING MULTI-POINT COMMUNICATIONS

(75) Inventor: Colin I'Anson, Ottery St Mary Devon (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 12/449,241

(22) PCT Filed: Jan. 29, 2008

(86) PCT No.: PCT/EP2008/051034
§ 371 (c)(1), (2), (4) Date: Jul. 30, 2009

(87) PCT Pub. No.: WO2008/092856
PCT Pub. Date: Aug. 7, 2008

(65) Prior Publication Data
US 2010/0027775 A1    Feb. 4, 2010

(30) Foreign Application Priority Data
Jan. 31, 2007    (GB) .................................. 0701736.1

(51) Int. Cl.
*H04L 12/16* (2006.01)

(52) U.S. Cl. .................... 370/260; 709/204; 379/203.01

(58) Field of Classification Search ............. 379/201.01, 379/203.01, 204.1; 370/260; 709/204
See application file for complete search history.

(56) References Cited

U.S. PATENT DOCUMENTS

| | | | |
|---|---|---|---|
| 4,455,455 A | 6/1984 | Little | |
| 5,239,571 A | 8/1993 | Takahashi | |
| 6,163,692 A | 12/2000 | Chakrabarti | |
| 7,085,558 B2* | 8/2006 | Berstis et al. | 455/416 |
| 7,613,136 B2* | 11/2009 | Daigle | 370/259 |
| 7,634,533 B2* | 12/2009 | Rudolph et al. | 709/203 |
| 2006/0031290 A1 | 2/2006 | Mannaru | |
| 2007/0033251 A1* | 2/2007 | Mandalia et al. | 709/204 |
| 2011/0305331 A1* | 12/2011 | Hughes et al. | 379/202.01 |

FOREIGN PATENT DOCUMENTS

| | | |
|---|---|---|
| WO | WO01/52513 | 7/2001 |
| WO | WO 01/52513 A | 7/2001 |
| WO | WO01/95660 | 12/2001 |
| WO | WO2005/101857 | 10/2005 |
| WO | WO2006/036259 | 4/2006 |
| WO | WO 2006/036259 A | 4/2006 |

OTHER PUBLICATIONS

International Search Report issued May 21, 2008 in Application No. PCT/EP2008/051034.
Great Britian Search Report mailed Apr. 13, 2007 from British patent application No. 0701736.1 filed Jan. 31, 2007.
Search Report and Written Opinion mailed May 21, 2008 from Serial No. PCT/EP2008/051034 filed Jan. 29, 2008.
Chinese office action mailed Oct. 10, 2012 for serial No. 200880003529.1 filed Jan. 29, 2008.

* cited by examiner

*Primary Examiner* — Creighton Smith

(57) ABSTRACT

A conferencing system, method and communication device for facilitating a conference call between a plurality of terminal devices is presented. The conference system comprises: a conference server for establishing the conference call; and re-connection means adapted to detect if a terminal device is disconnected from the conference call and to re-connect a terminal device to the conference call if it is detected that the terminal device is disconnected from the conference call.

17 Claims, 3 Drawing Sheets

METHOD AND SYSTEM FOR FACILITATING MULTI-POINT COMMUNICATIONS

This application is a national phase application of International Application No. PCT/EP2008/051034, filed on Jan. 29, 2008, which claims priority of GB Application No. 0701736.1, filed on Jan. 31, 2007, which is hereby incorporated by reference in its entirety.

FIELD OF THE INVENTION

This invention relates to the field of communications, and more particularly to a method and system for facilitating multi-point communications such as conference calls.

BACKGROUND

Conference calls are typically provided by a conference service and are used to enable a calling party to have one or more other parties partake in a call. Such a conference call may allow all parties to participate during the call, or the conference call may be established so that some parties merely listen into the call and do not have a voice path to the conference.

Conference calls can be set up so that the calling party calls other participants and adds them to the call. Alternatively, other participants may be able call into the conference call themselves using specific details, such as a special telephone number, passcode and/or identification details.

Although conference calls may be used for entertainment or social purposes, they are primarily used for business purposes, namely to hold meetings whilst one or more users are situated at a remote location or traveling.

If a user involuntarily loses their connection to a conference call (i.e. becomes disconnected), in order to rejoin the conference call the user is required to repeat the process of re-connecting to the conference call. Such a process is often complicated and may require the user to provide specific details as mentioned above. There is a high probability that the user will not remember or have available the details that are necessary to re-connect to the conference call. Further, the user may be in a situation in which it is not easy or convenient to undertake and complete the re-connection process. Ultimately, during the time that the user is not connected to the conference, they may miss important details of the discussion that is taking place in the conference call.

It is therefore desirable to develop an improved conference call system which facilitates and/or improves the re-connection process of a user when they are involuntarily disconnected from a conference call.

It is known to arrange a server (otherwise known as a conference centre or conference bridge) of a conference call to detect when a participant of the conference call has become disconnected from the conference call, and to call the disconnected user in order to re-establish the user's connection to the conference call. This approach, however, does not address the issues associated with pre-pay billing methods used by service providers to bill users for calls. Equally this approach cannot distinguish between unintentional and deliberate disconnection of a conference call.

In fact, pre-pay billing methods are particularly problematic for the field of conference calling, since conference calls are often provided as a premium service and are therefore charged on a higher tariff. Pre-pay users must knowingly accept the higher cost call and also be ready for the moment when they run out of credit.

A connect/reconnect method based on the conference centre calling a disconnected user will struggle to integrate with the pre-pay billing system. This pre-pay billing system will need to stop the call as soon as the credit grace period expires, and will therefore require complex system integration with the conference centre.

Accordingly, a more simple solution to the problem of reconnecting involuntarily disconnected conference call users is desirable. It is also desirable to develop a solution that may be implemented with existing pre-pay billing methods, and/or will not require further complex integration with existing billing or communication systems.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

According to an aspect of the invention, there is provided a conferencing system for facilitating a conference call between a plurality of terminal devices, the conference system comprising: a conference server for establishing the conference call; and re-connection means adapted to detect if a terminal device is unintentionally disconnected from the conference call and to re-connect a terminal device to the conference call if it is detected that the terminal device is disconnected from the conference call, wherein the re-connection means comprises a set of instructions to be executed or used within the terminal device.

According to another aspect of the invention, there is also provided a method for facilitating a conference call using a conference system comprising a plurality of terminal devices and a conference server, the method comprising the steps of: detecting if a terminal device is disconnected from the conference call; and reconnecting a terminal device to the conference call if it is detected that the terminal device is disconnected from the conference call, wherein the steps of detecting and reconnecting are completed in at least one of the terminal devices.

Figure 1:
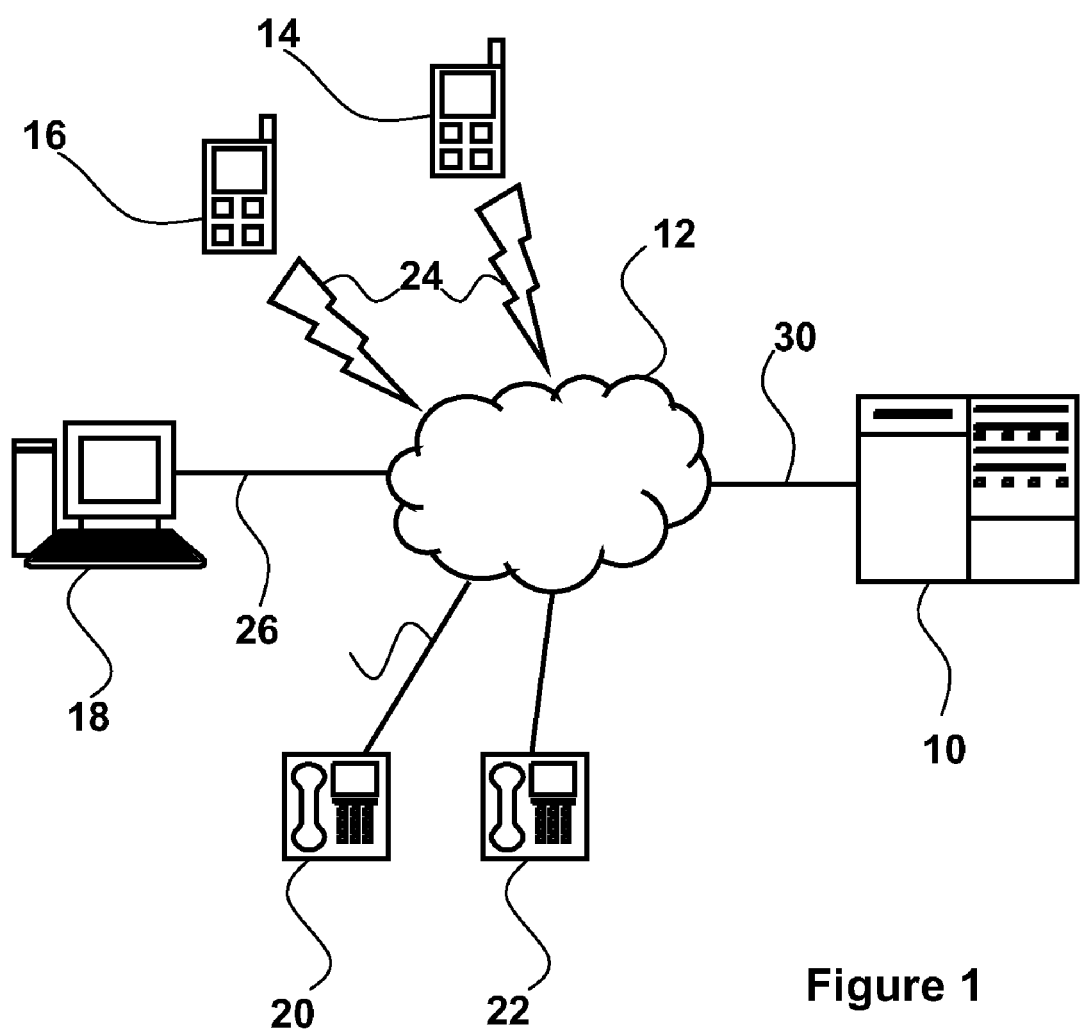
FIG. 1 is a high-level block diagram of a system for facilitating conference calls according to an embodiment of the invention.

Referring to FIG. 1, a conferencing system for facilitating a conference call between a plurality of terminal devices comprises a conference server 10 that is connected to the plurality of terminal devices via a suitable communication network 12. The plurality of terminal devices comprise first 14 and second 16 mobile devices, a personal computer 18, and first 20 and second 22 Plain Old Telephone Service-type (POTS-type) devices.

Each of the first 14 and second 16 mobile devices includes a processor and a mobile network communications unit. The mobile network communications unit of each mobile device is in wireless communication (indicated generally by feature 24) with the communications network 12 in a known way, for example using GSM, Third Generation (3G), or any other suitable mobile communications standard.

The second mobile device 16 differs from the first mobile device 14 in that it also comprises a video camera and a suitable software application enabling the mobile device 16 to be used as a video conferencing device. In other words, the second mobile 16 can send and receive video data via the wireless communication link 24.

The personal computer (PC) 18 is a conventional PC having a network communications unit for communicating with the communication network 12 via the internet 26. The PC 18 in this embodiment includes a suitable software application for enabling a user of the PC 18 to make calls to other terminal devices via the internet 26. Such software is well known in the art and will not be described further.

Each of the first 20 and second 22 POTS-type devices includes a POTS-type communications unit. The POTS-type communications unit of each POTS-type device is in communication with the communications network 12 via a POTS connection 28 (i.e. a Public Switched Telephone Network (PSTN) link).

The conference server 10 is connected to the communication network 12 via a suitable communication link 30, and adapted to receive and store scheduling requests and/or information from at least one of the terminal devices. The requests and/or information may be received via any one of a number of suitable communication methods, for example Short Message Service (SMS), Electronic mail, or Web-based entry/delivery, to name but a few. In this way, a user of a terminal device can arrange a conference call by providing relevant information to the conference server in the form of a scheduling request.

Purely by way of example, a scheduling request may include details specifying the date, time and length of a proposed conference call, along with details of the proposed participants, the identity of their terminal device(s) and required security information (such as a passcode). The conference server 10 can then use such details to establish a conference call at the proposed time.

To establish a conference call, the conference server 10 can call all of participants to connect the participants to the same conference call. Alternatively, the conference server 10 may simply send a reminder message to the participants, which reminds the recipients that they are due to participate in conference call. This reminder may also include information relevant to the conference call, such as the address/number to connect to, and the required security information. Of course, at the proposed time, the conference server 10 need not call or send a message to all of the proposed participants. Instead, the conference server 10 may only call or remind a single participant (i.e. the user that requested the conference call) in order to establish the conference call.

In the embodiment of FIG. 1, the conference server 10 sends a suitable notification message to all of the proposed participants, the message reminding each recipient that they are due to participate in a conference call and asking whether they wish to connect to the conference call. The recipient can either reject or accept the reminder message, and if the message is accepted the corresponding terminal device can use the content of the reminder message to automatically connect to the conference call (i.e. by executing a set of instructions in the terminal that causes the terminal device to call the required number and provide the necessary security information).

The notification message sent to each participant also includes a software application (otherwise referred to as an "applet") that is adapted to be run by the terminal device of the participant. The software application is adapted to monitor the status of the terminal device's connection to the conference call and to detect if the terminal device is disconnected from the conference call. If it is detected that the terminal device is disconnected from the conference call, the software application controls the terminal device to automatically re-connect to the conference call. Of course, the software application may be adapted to enable the user of the terminal device to select whether or not they wish to re-connect to the conference call, avoiding the possibility of the software application automatically re-connecting the terminal device to the conference call against the user's wishes.

The conference call can be terminated by users closing their connection to the conference server. Individuals can leave the conference call when they require. For a conference call of a scheduled length the conference call is terminated by the conference server 10 which may in turn communicate with the connected terminal devices to indicate that the conference call is ended and cause the software application in each connected terminal device to stop monitoring the status of its connection to the conference call. The software application may, of course, also be adapted to disconnect its corresponding terminal device upon notification from the conference server 10 or the network 12 that the conference call has been terminated.

Although the system has been described as delivering the software application to a terminal device when it invites the terminal device to be connected to a proposed conference call, the software application may instead be pre-installed within a terminal device. For example, the software application may be provided in suitable memory storage means within a terminal device at the time of manufacture. Alternatively, it may be downloaded from a device management server in the network to suitable storage means of a terminal device after the time or manufacture but before the device is used to connect to a conference call (for example, via a firmware or software update process).

For a better understanding, a method according to the invention will now be described with reference to the flow diagram shown in FIG. 2.

In step 210, a user of a terminal device sends a scheduling request to the conference server 10 so as to propose and schedule a conference call. The request contains information relating to the date and time of the conference call, the identity and contact details of the participants, a passcode and a preferred establishment method. The preferred establishment method defines how the user wishes to establish the conference call, i.e. whether or not users are to be reminded and connected automatically. In this example, the user prepares the scheduling request by filling in a web-based form and sends the request by submitting the completed web-based form to the conference server 10 via the internet.

The conference server 10 then receives the scheduling request in step 215 and stores the information contained in the request within a database.

At the scheduled date and time, the conference server 10 sends a notification messages to the terminal devices associated with each proposed participant, in order to connect the participants to the conference call (step 220). The message reminds the recipient that they are due to participate in a conference call and asks whether they wish to connect to the conference call. Each recipient can then either ignore or note the message in step 225. In this example, all of the proposed participants will accept the invitation to connect to the conference call and are therefore subsequently connected to the conference call.

In step 230, the conference server 10 manages the connection of all of the corresponding terminal devices and transmits or downloads an appropriate software application to each connected terminal device. Each software application is programmed and compiled according to the specific requirements of the terminal device it is intended to be received by. Nonetheless, the common feature of the terminal-specific applications is that, when run, they monitor the status of the corresponding terminal device's connection to the conference call and detect if the terminal device becomes involuntarily disconnected from the conference call during the call.

Each connected terminal executes/runs the software application it received from the conference server. Initially the user is asked if they wish to take part in the conference call. If they do the software application makes a phone call and thereby connects to the conference centre using the information in the reminder request and/or the downloaded application. The connection status of terminal device is monitored in step 235. Thus, the connection of each terminal device to the conference call is monitored and the method continues to step 240.

In step 240 it is established (either by the software application a terminal device, or by the conference server) whether or not the conference call has been intentionally terminated. If it is determined that the conference call has been intentionally terminated, the method continues to step 245 in which the terminal devices are disconnected from the conference call and the conference call is ended.

If, on the other hand, it is determined that the conference call has not been intentionally terminated, the method proceeds to step 250 in which is determined (by the software application of a terminal device or by a request to the user) whether or not a terminal device has been disconnected from the conference call. If it is determined that a terminal device has not been disconnected from the conference call, the method returns to step 235 in which the connection status of the terminal devices is monitored.

If it is determined that a terminal device has been disconnected from the conference call, the method proceeds to step 255. In step 255, the software application for automatically re-connecting the disconnected terminal device to the conference call is run. Here, the software application enables the user of the terminal device to select whether or not they wish to re-connect to the conference call. The method therefore proceeds to step 260, in which the user is prompted (by communicating a message to the user via an appropriate interface of the terminal device) to select if they want the terminal device to be re-connected. If the user indicates that the terminal device should not be reconnected (i.e. by pressing a button on the terminal device that provides a "NO" signal to the software application), the method continues to step 265 where the software application of the terminal device is stopped and the terminal device remains disconnected from the conference call.

If, alternatively, the user indicates that the terminal device should be reconnected (i.e. by pressing a button on the terminal device that provides a "YES" signal to the software application), the method advances to step 270. In step 270, the software application reconnects the terminal device to the conference call. In doing so, the software application uses the appropriate connection information (i.e. connection number and required security details) that was provided from the conference server along with the software application and/or in the conference call reminder. It will be understood that such connection information may either be provided to (and stored by) the terminal device separately from the software application, or it may be incorporated into the program code/instructions of the software application that is sent to a terminal device. Ultimately, the connection information is readily available to the software application (even when the terminal device is disconnected from the conference call and/or the conference server) so that the software application can automatically re-connect the terminal device.

After the terminal device is re-connected to the conference call, the method returns to step 235.

Automatic reconnection to a conference call can selectively be stopped after the scheduled completion time of the call.

An alternative method according to the invention will now be described with reference to the flow diagram shown in FIG. 3.

In step 310, a user of a terminal device sends a scheduling request to the conference server 10 so as to propose and book a conference call. The request contains information relating to the proposed date and time of the conference call, the identity and contact details of the participants, passcode and a preferred establishment method. For example, the passcode may be assigned by the user or by the conference server. The latter approach may be preferable so as to prevent users all selecting the same passcode.

In this example the user logs onto the conference server using WAP or some other lightweight means to use a conference server based web page and provides details of the participants, etc.

The conference server 10 then receives the scheduling request in step 315 and stores the information contained in the request within a database.

At the scheduled date and time, the user calls the conference server 10 to initialize the proposed conference call (step 320). The conference server establishes the necessary details (i.e. time of call, identity of caller, and required security information) and undertakes the steps required to create a conference call for other participants to join. Of course, the conference server 10 may also send out an early advisory of the call to all participants via SMS or e-mail, for example.

In the step 325, the conference server sends a notification message to the corresponding terminal device(s) of the remaining participants. The message reminds the recipient that they are due to participate in conference call and asks whether they wish to connect to the conference call. Each recipient can then either reject or accept the message. In this example, only two other proposed participants accept the invitation to connect to the conference call and are therefore connected to the conference call.

In step 330, the conference server 10 manages the connection of the two remaining terminal devices and transmits an appropriate software application to each connected terminal device. Here, one of the connected terminal devices is detected as already having the appropriate software application installed. The conference server therefore refrains from sending the software application to that device. Instead, the conference server ensures that the terminal device is provided with the appropriate connection information for the conference call.

The software application for each terminal device is programmed and compiled according to the specific requirements of the terminal device. Nonetheless, the common feature of the terminal-specific applications is that, when run, they monitor the status of the corresponding terminal device's connection to the conference call and detect if the terminal device is disconnected from the conference call.

In a further embodiment, the conference server also transmits information about the actual participants to the connected terminal devices. Using this information, the users of the connected terminal devices can be informed of the participants of the conference call.

Each connected terminal executes/runs its corresponding software application and the connection status of each terminal device is monitored in step 335. Thus, the connection of each terminal device to the conference call is monitored and the method continues to step 340.

In step 340, it is established (either by the software application in a terminal device, or by the conference server) whether or not the conference call has been intentionally terminated (i.e. connection to the conference call has been intentionally ended, either by the caller or the server). If it is determined that the conference call has been intentionally terminated, the method continues to step 345 in which the terminal devices are disconnected from the conference call and the conference call is ended.

If, on the other hand, it is determined that the conference call has not been intentionally terminated, the method proceeds to step 350 in which is determined (by the software application of a terminal device) whether or not a terminal device has been disconnected from the conference call. If it is determined that terminal device has not been disconnected from the conference call, the method returns to step 335 in which the connection status of the terminal devices is monitored.

If it is determined that a terminal device has been disconnected from the conference call, the method proceeds to step 355. In step 355, the software application for automatically re-connecting the disconnected terminal device to the conference call is run and reconnects the terminal device to the conference call. In doing so, the software application uses the appropriate connection information (i.e. connection number and required security details) that was provided from the conference server in step 330.

After the terminal device is re-connected to the conference call, the method returns to step 335.

Figure 2:
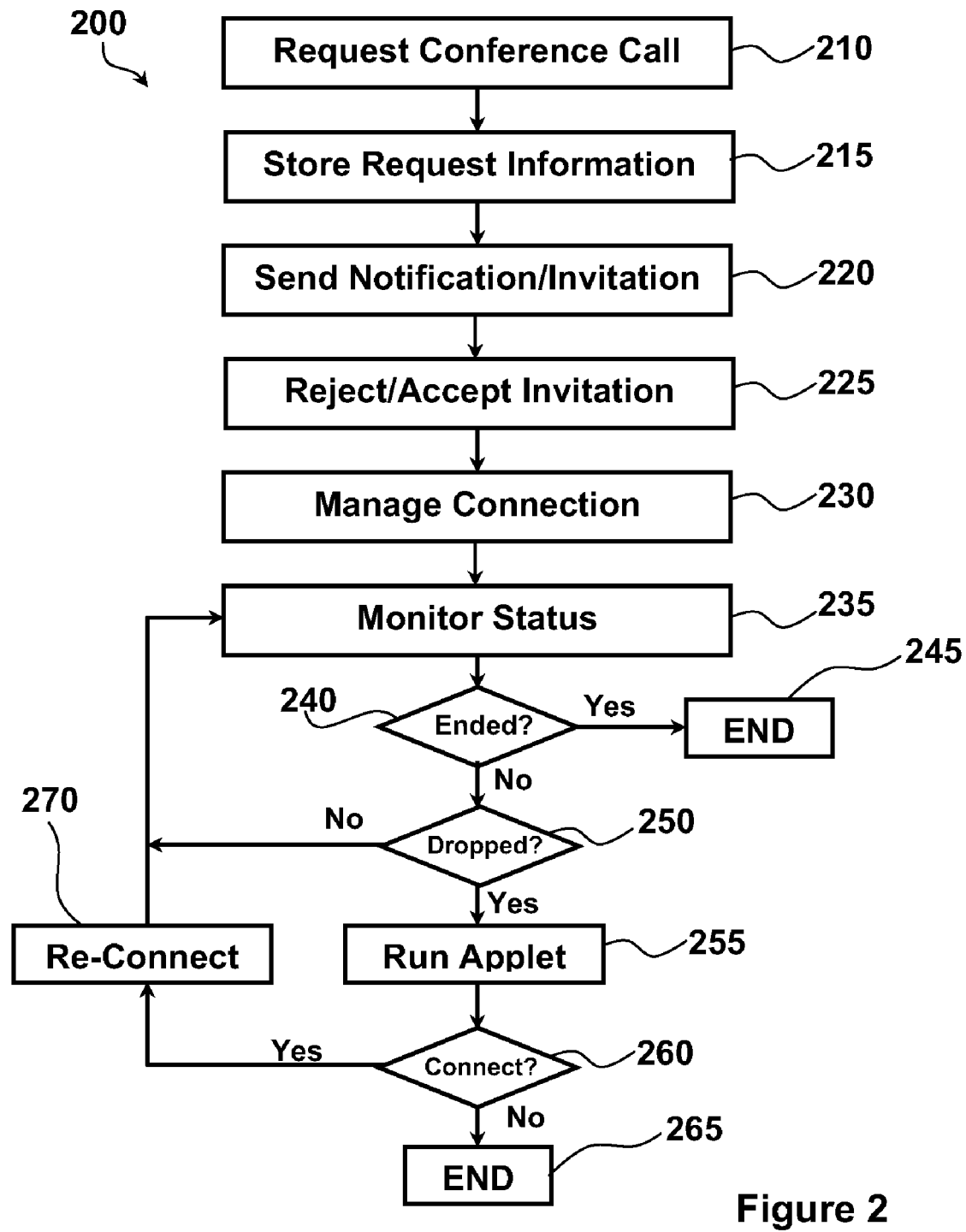
FIG. 2 is an exemplary flow diagram of a method for facilitating conference calls according to an embodiment of the invention.
Figure 3:
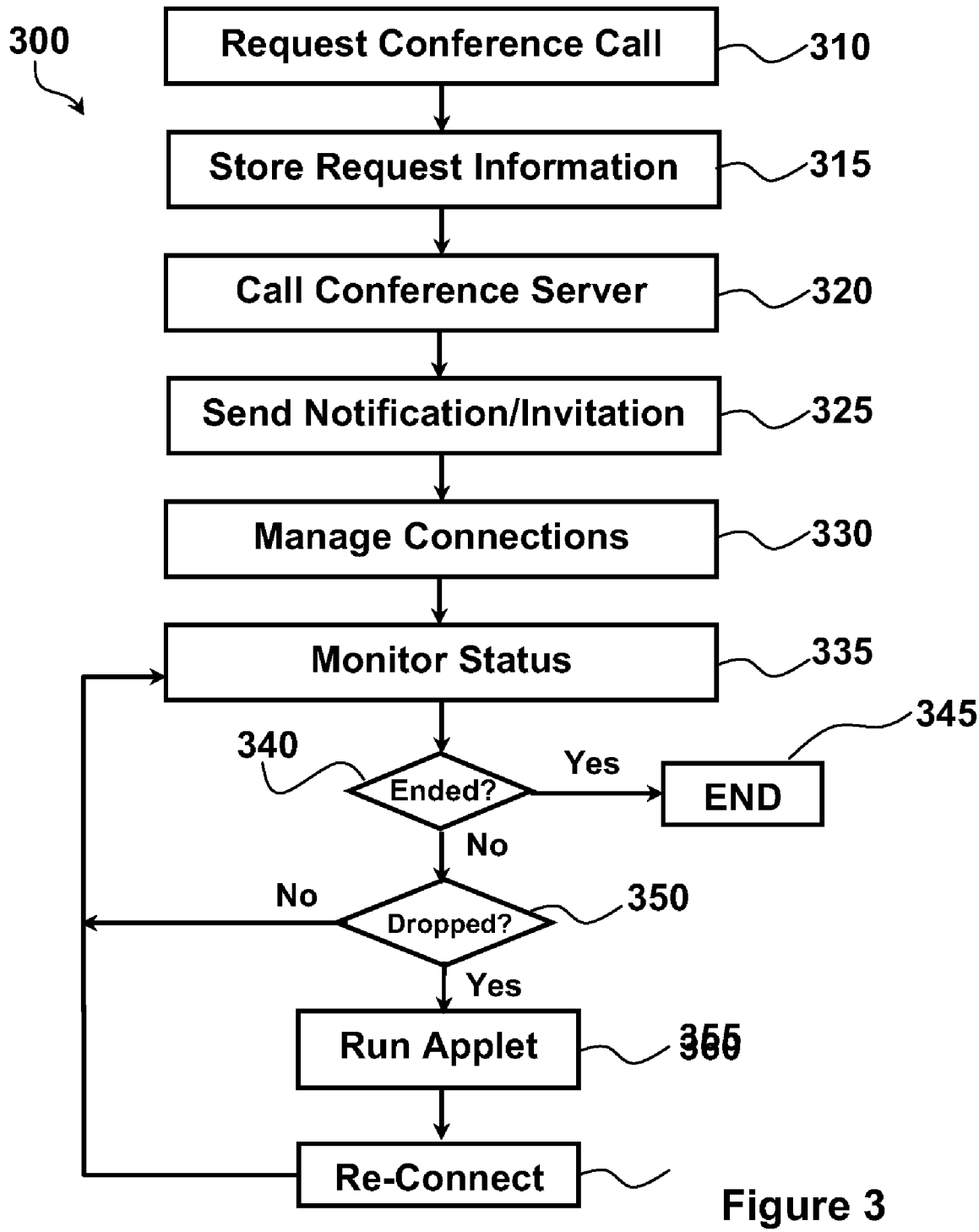
FIG. 3 shows a flow diagram of a method according to an alternative embodiment of the invention.

It will therefore be understood that the method of FIG. 3 differs from that of FIG. 2 by virtue of the method used to establish the conference call. It is also noted that the method of FIG. 3 does not provide the user of a disconnected terminal device with the option of re-connecting (it, instead, automatically re-connects a terminal device which has been unintentionally disconnected from the conference call).

The common aspect linking the methods is that they both include the steps of detecting if a terminal device is disconnected from the conference call and re-connecting a terminal device to the conference call if it is detected that the terminal device is disconnected from the conference call. Here, these common steps are undertaken by a re-connect applet that comprises a set of instructions which is executed within the terminal device.

To further assist understanding, a conference call using the invention described herein may be summarized as comprising the following steps:

1. It is determined that it is time for a proposed conference call;
2. The participants are either called by a conference server or call into the conference server in order to connect to the conference call;
3. As the conference call is established, a software application is provided to each of the connected devices (or, in the case of a device already having such a software application, the necessary connection information is provided to the device);
4. The software application runs in the each of the connected devices and monitors the status of the device's connection to the conference call; and
5. If a device's connection is unintentionally dropped, the software application reconnects the device's connection to the conference call (either the reconnection is made automatically or a request is made to the user requesting confirmation that reconnection should take place).

The invention resolves the pre-pay billing issues that a server-based reconnection solution cannot. A server-based reconnection approach will struggle to integrate with the pre-pay billing system and requires complex system integration. A terminal-based approach, on the other hand, does not require a special connection to the billing system, since the standard pre-pay connection and calling mechanisms apply. Thus, with the invention disclosed herein, there is no special system integration and only one special conference tariff to set up.

Reconnection of a disconnected device via an applet available within the device is also better for simple conference call set up because the applet can include or obtain the necessary setup and connection instructions with minimal user involvement.

While specific embodiments have been described herein for purposes of illustration, various modifications will be apparent to a person skilled in the art and may be made without departing from the scope of the invention.

The invention claimed is:

1. A conferencing system for facilitating a conference call between a plurality of terminal devices, the conference system comprising:
    a conference server to
        receive a scheduling request for the conference call, wherein the scheduling request includes a predetermined time for the conference call and contact information of the plurality of terminal devices;
        at the predetermined time of the conference call, transmit a notification message to the plurality of terminal devices to invite participation in the conference call;
        establish the conference call with each terminal device accepting the invitation; and
        detect if a terminal device, for which the conference call was established, is disconnected from the conference call and re-connect the disconnected terminal device to the conference call,
        wherein the notification message transmitted to the plurality of terminal devices further includes a software application to enable the plurality of terminal devices to call the conference server and connect to the conference call.

2. A conference system according to claim 1, wherein, to re-connect the disconnected terminal device to the conference call, the conference server is to transmit a set of instructions to enable a user of the disconnected terminal device to selectively re-connect the disconnected terminal device to the conference call.

3. A conference system according to claim 1, the software application further enables the terminal devices to re-connect to the conference call.

4. A conference system according to claim 1, wherein the conference server is to store information relating to proposed participants of the conference call.

5. A conference system according to claim 1, wherein the conference server is to store security information relating to verification details required for a connection to the conference call to be established, and to communicate the security information to the plurality of terminal devices.

6. A conference system according to claim 5, wherein the conference server is to utilize the security information to re-connect the disconnected terminal device.

7. A conference system according to claim 1, wherein the plurality of terminal devices comprises anyone of a mobile telephone, a POTS-type telephone, a personal computer and a video conferencing device.

8. A conference system according to claim 1, wherein the conference server is further to detect if the disconnected terminal device is involuntarily disconnected from the conference call.

9. A method for facilitating a conference call using a conference system comprising a plurality of terminal devices and a conference server, the method comprising:
    receiving, by the conference server, a scheduling request for the conference call, wherein the scheduling request includes a predetermined time for the conference call and contact information of the plurality of terminal devices;
    at the predetermined time of the conference call, transmitting, by the conference server, a notification message to the plurality of terminal devices to invite participation in the conference call; and
    establishing the conference call with each terminal device accepting the invitation,
    wherein the notification message further includes a software application to enable the plurality of terminal devices to call the conference server and connect to the conference call.

10. A method according to claim 9, further comprising:
    detecting if a terminal device, for which the conference call was established, is disconnected from the conference call; and
    transmitting a set of instructions to the disconnected terminal device to provide a user of the disconnected terminal device with an option of reconnecting the disconnected terminal device to the conference call.

11. A method according to claim 9, further comprising:
    storing schedule information relating to the predetermined time for establishing the conference call.

12. A method according to claim 9, wherein the software application further enables the terminal devices to re-connect to the conference call.

13. A method according to claim 9, further comprising:
    storing security information relating to verification details required for a connection to the conference call to be established;
    communicating the security information to the plurality of terminal devices.

14. A method according to claim 9, wherein the plurality of terminal devices comprises anyone of a mobile telephone, a POTS-type telephone, a personal computer and a video conferencing device.

15. A non-transitory computer readable medium storing computer readable instructions which when executed cause a conference server to facilitate a conference call between a plurality of terminal devices, the computer readable instructions comprising machine readable code to:
    receive, by the conference server, a scheduling request for the conference call, wherein the scheduling request includes a redetermined time for the conference call and contact information of the plurality of terminal devices;
    at the predetermined time of the conference call, transmit, by the conference server, a notification message to the plurality of terminal devices to invite participation in the conference call; and
    establish the conference call with each terminal device accepting the invitation,
    wherein the notification message further includes a software application to enable the plurality of terminal devices to call the conference server and connect to the conference call.

16. The non-transitory computer readable medium of claim 15, wherein machine readable code to re-connect the at least one terminal device to the conference call includes machine readable code to:
    transmit a set of instructions to the disconnected terminal device to enable a user of the disconnected terminal device to selectively re-connect the disconnected terminal device to the conference call.

17. The non-transitory computer readable medium of claim 15, wherein the software application further enables the terminal devices to re-connect to the conference call.

* * * * *

UNITED STATES PATENT AND TRADEMARK OFFICE
CERTIFICATE OF CORRECTION

| | | |
|---|---|---|
| PATENT NO. | : 8,369,247 B2 | |
| APPLICATION NO. | : 12/449241 | |
| DATED | : February 5, 2013 | |
| INVENTOR(S) | : Colin I'Anson | |

It is certified that error appears in the above-identified patent and that said Letters Patent is hereby corrected as shown below:

In the Claims:

In column 10, line 14, in Claim 15, delete "redetermined" and insert -- predetermined --, therefor.

Signed and Sealed this
Twenty-fifth Day of June, 2013

Teresa Stanek Rea
*Acting Director of the United States Patent and Trademark Office*